Aug. 1, 1967     F. A. WYCZALEK     3,333,323
SONIC VIBRATION SPOT WELDING
Original Filed July 31, 1962
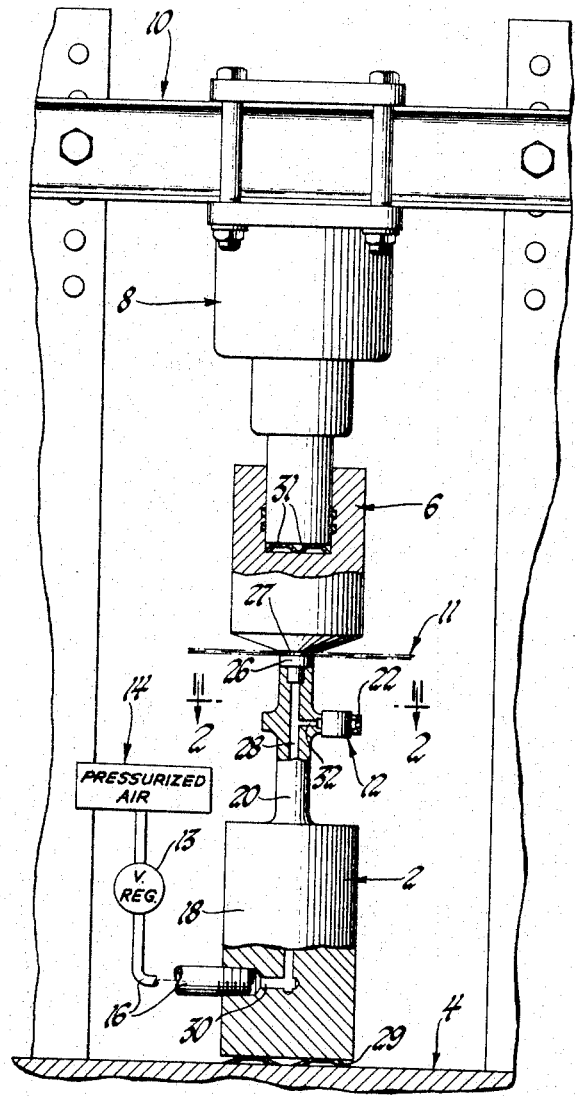
Fig. 1
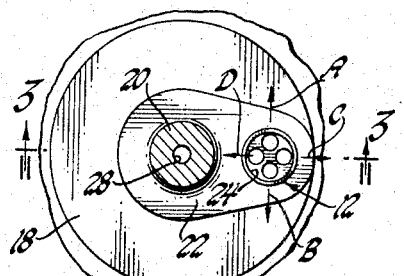
Fig. 2
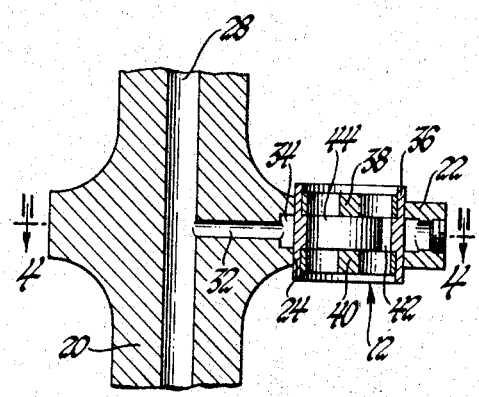
Fig. 3
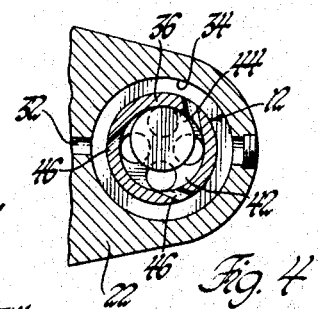
Fig. 4
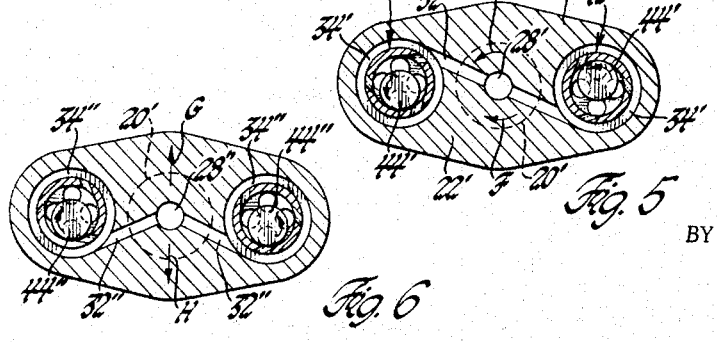
Fig. 5
Fig. 6
INVENTOR.
BY Floyd A. Wyczalek
W. F. Wagner
ATTORNEY United States Patent Office 3,333,323
Patented Aug. 1, 1967

3,333,323
SONIC VIBRATION SPOT WELDING
Floyd A. Wyczalek, Birmingham, Mich., assignor to General Motors Corporation, Detroit, Mich., a corporation of Delaware
Original application July 31, 1962, Ser. No. 213,813, now Patent No. 3,225,997, dated Dec. 28, 1965. Divided and this application Dec. 3, 1964, Ser. No. 415,627.
4 Claims. (Cl. 29—470)

ABSTRACT OF THE DISCLOSURE

A method of welding members together which includes the steps of disposing the surface of one member in contact with the surface of another member followed by clamping the members between the end portions of a pair of columns so that a force is applied in one area of the members. One column is then driven in a combined torsional and oscillatory mode at the resonant frequency of the column whereby vibratory energy is directed to the one area so as to form a weld between the members.

This application is a division of application United States Ser. No. 213,813, filed July 31, 1962, now Patent No. 3,225,997, in the name of Floyd A. Wyczalek.

This invention relates to a welder and more particularly to a method for utilizing vibratory energy for bonding two or more metallic members together.

The use of vibratory energy for the purpose of welding or bonding separate metallic sheet members to each other is not new. The prior art teaches the use of an electrically driven transducer for causing frictional heat to be generated between the intersurfaces of two contacting sheets of metal so as to complete a weld. The difficulty of this device, however, has been that a transducer or vibration generator composed of magneto-striction bars or the like is incapable of driving a body in high power applications. One reason being that this form of vibration generator is inherently limited to motion of only a few feet per second due to limitation imposed by elastic strain limits. Hence, to couple a magneto-strictive type generator to a resonant member results in a practical limit to the amount of power which can be transferred to the driven member.

Accordingly, one object of the present invention is to provide a method for bonding two members together in which vibratory energy is used to complete the weld with the vibratory energy being efficiently transmitted to the weld area through a resonant member driven by a high power mechanical vibrator.

Another object of the present invention is to provide a method for welding sheets of metal together with one of the members between which the sheets are clamped being so associated with a vibration generator that the latter generates a rotating force vector normal and offset from the longitudinal axis of the members so that a combined torsional and oscillatory mode of vibration results.

The above and other objects are obtained in accordance with the invention by a device having a column or vibration transmitting member associated with one or more vibrators capable of delivering large forces to the member at the resonant frequency thereof so as to supply an increased amount of energy in the welding area. This is accomplished by having the vibratory column dimensioned to resonate in a flexural mode and suitably supported on a base which serves as a reaction mass to preclude any energy dissipation. One or more fluid driven vibrators are connected to the member at the flexural antinode thereof in a posititon offset from the longitudinal axis thereof so as to provide a rotating force vector that causes a desired bending of the column. A reaction mass, serving as a reflector anvil, is positioned in vertical alignment with the vibratory column and includes mechanism for exerting a predetermined amount of force in a localized area of the sheets being welded.

A more complete understanding of the subject invention can be derived from a perusal of the detailed description taken in conjunction with the accompanying drawings in which:

FIGURE 1 is an elevation view, with portions broken away, of a welding device incorporating the present invention;

FIGURE 2 is a view taken on lines 2—2 of FIGURE 1;

FIGURE 3 is a fragmentary view taken on lines 3—3 of FIGURE 2;

FIGURE 4 is a fragmentary view taken on lines 4—4 of FIGURE 3;

FIGURE 5 is a view similar to FIGURE 2 but in section showing the welding device of FIGURE 4 employing a dual vibrator arrangement, and FIGURE 6 is a view showing a modification of the dual vibrator arrangement of FIGURE 5.

Referring to FIGURE 1, a welding press is shown made in accordance with the inventiton and comprising a vibration transmitting member 2 supported by a base 4 and located in vertical alignment with a movable reflector anvil 6. An air-operated mechanism 8 is fixed to a rigid cross beam 10 and includes the conventional piston and rod connecting to the reflector anvil 6 for moving the latter downwardly to coact with the member 2 for holding at least two sheets 11 of metal or other material therebetween. An air driven vibrator 12 is mounted to the member 2 for transmitting vibratory energy to the welding zone and is energized by compressed air supplied under the control of a valve 13 and originating in a source 14 connected with the member 2 by the conduit 16.

The member 2 comprises cylindrical column portions 18 and 20, respectively, with the upper column 20 being of a reduced diameter and extending vertically upwardly from the lower portion 18. The column 20 constitutes the vibratory portion of the member 2 and has a laterally extending integral support arm 22 having a circular opening 24 for suitably accommodating the vibrator 12. A plug member 26 closes the upper end of a vertical air passage 28 formed in the column 20 and includes a spherical bearing portion 27 for engagement with the underside of one of the sheets 11 during the welding operation. The plug member is made from a nickel alloy which has a low energy loss and possesses good fatigue properties in addition to having the characteristics of thermal conductivity which is less than steel. The lower end of the member 2 is supported on the base 4 by a pair of Belleville springs 29 which rest on the base and serve to isolate the member 2 to minimize the energy loss therefrom when the vibrator is operating. A pair of Belleville springs 31 are also interposed between the anvil 6 and operating means 8 for the same purpose.

The air passage 28 extends through the center of the member 2 and communicates at a lower portion thereof with a transverse passage 30 that connects with the compressed air conduit 16. Near its upper end, the passage 28 communicates with a second transverse passage 32 that leads into the arm 22 and connects with an annular chamber 34 circumferentially enveloping the vibrator 12.

The vibrator 12 includes a cylindrical housing 36 closed at the opposite ends thereof by apertured disks 38 and 40 which, together with the housing, define a confining chamber 42 for a cylindrical roller-type mass 44. The arrangement is such that pressurized air flows from the source 14 via the passages 30, 28, 32, and chamber 34 to discharge through a plurality of tangentially directed orifices 46 formed in the housing 36 and surrounding the confining chamber 42. The air exits from the several orifices as a thin high velocity stream and impinges against the periphery of the roller to drive the latter in an orbital path about the confining chamber. As the roller orbits about the chamber, it applies a centrifugal force against the housing 36 at different points so as to produce, in effect, a rotating force vector that acts in a direction transverse to the longitudinal axis of the column 20 and transmits vibratory energy thereto. For most efficient operation, the vibrator is driven at a frequency equal to the resonant frequency of the column 20 to create a flexural standing-type wave in the latter. The column 20 forms a fixed-hinged beam and the hinged boundary is formed by the welding area defined by the contact surface between the anvil and plug member. As is well known to those skilled in the art of vibrations, during standing wave vibration the points of minimum and maximum deflection are termed nodal and antinodal points, respectively. For a fixed-hinged beam, the end boundaries are nodes which are points of high force and low velocity. The antinode, on the other hand, is a point of low force and high velocity located between the nodes. In this case, the vibrator 12 is mounted at the antinode.

To complete a welding operation with the present invention, two or more metallic plates 11 are positioned as shown in FIGURE 1 between the reflector anvil 6 and the plug member 26 with the plates being held therebetween by a predetermined amount of force being applied by the operating mechanism 8 which derives its pressurized air from the source 14 or some other. It has been found that when welding a pair of metal plates, a preload is necessary to maintain the plates in a rigid position prior to exciting the vibrator 12 so that vibratory energy may be transmitted to the metal. The vibrator is then energized by opening the valve 13 and providing pressurized air at a pressure and flow rate which causes the roller 44 to orbit about the confining or working chamber to create a rotating force vector at the resonant frequency of the column 20. Due to the offset position of the vibrator relative to the longitudinal axis of the column 20 and when the roller is in the position of FIGURE 4, a force vector as indicated by A in FIGURE 2 acts as a moment arm to torsionally twist the column 20. Similarly, when the roller is at a point diametrically opposite to that shown in FIGURE 4, a force B is produced as seen in FIGURE 2 to twist the column about its axis in an opposite direction. As the vector rotates to a position where the roller contacts the housing in line with the longitudinal axis of the support arm, indicated by force arrows C and D, an oscillatory bending is created in the column resulting in a similar movement of the plug member. As should be apparent, the combined torsional and oscillatory movement of the plug member at the resonant frequency of the column causes a scrubbing action against the sheets which results in a weld between the latter attributable to oxide film breakdown and/or heating at the weld zone due to friction. As alluded to hereinbefore, it has been found that for most efficient operation of the present invention, the vibrators should be operated at a frequency equal to the resonant frequency of the vibration transmitting column. By so doing, the deflection and therefore energy delivered by the plug member to the weld zone is at a maximum for a given amount of energy being put into the system.

FIGURE 5 shows a modification of the present invention which is similar to the preferred embodiments; however, is provided with two rather than a single vibrator. The vibrators 12' are mounted in support arms 22' which in this instance extend from opposite sides of the column 20' and are connected to the air passage 28' by a diagonal passage 32' that tangentially meets the annular air chambers 34' at opposite sides of the longitudinal axis of the support arms 22'. Because of this arrangement, when pressurized air is applied to each of the vibrators, the associated rollers 44' are driven in a counterclockwise diretiton at a phase difference of 180° so as to cancel out any forces acting along the longitudinal axis of the support arms, however, the forces provide a couple about the column 20' when the rollers are acting in any direction other than along the support arm axis. The force couple acting on the column 20' causes resonant torsional twisting of the latter in alternate directions as indicated by the arrows E and F. To weld two sheets of metal with this device, the procedure would be identical to that described above except that with this device the vibrators would develop a pure torsional movement of the column 20' and energy developed by this movement would be transferred to the welding zone by the plug member 26 to complete the weld. For best welding results, it has been found that the bearing portion 27 of the plug member should be formed so as to have an annular contact surface for engaging the outer surface of one of the sheets 11. Thus, the completed weld would leave a ring-type impression in the sheets.

FIGURE 6 shows a further modification of the invention, which essentially differs from the above modification by the disposition of the air passages 32'' in an inverted V form so that the ends thereof connect with the respective air chambers 34'' of the vibrators on the same side of the longitudinal axis of the support axis. With this arrangement, the rollers 44'' are driven in directions opposite to each other so that the forces produced thereby eliminate any torsional twisting of the column and produce only an oscillating movement thereof in a direction normal to the longitudinal axis of the support arms as indicated by the arrows G and H. Thus, with the rollers in the positions illustrated in FIGURE 6, the column would move downward in the direction of the arrow H. As the rollers move in opposite directions toward positions diametrically opposite to that shown, the forces cancel out until the extreme opposite position is reached at which time the sum of the force vectors act in the direction of the arrow G to move the column in that direction. With this system, solely oscillatory movement of the column is obtained for completing the weld at the resonant frequency of the latter.

It should be noted that the vibrators employed with each of the devices described above obtain a frequency multiplying effect. Reference is made to the patent to Svenson 2,194,410 for a full explanation of this feature; however, for present purposes suffice to say that the frequency multiplication occurs whenever the roller is of a diameter greater than one-half the diameter of the confining chamber. With this relationship, for each complete revolution of the roller about its axis, a number of force impulses greater than one occurs against the housing of the vibrator.

Various changes and modifications can be made in the above-described structures without departing from the spirit of the invention. It should be understood that such changes and modifications are contemplated by the inventor and he does not intend to be limited except by the scope of the appended claims.

What is claimed is:

1. A method of welding members together comprising disposing the surface of one member in contact with the surface of a second member, clamping the members between the end portions of a pair of columns so that a force is applied in one area of the members, driving one of the columns in a combined torsional and oscillatory mode at the resonant frequency of said column whereby energy is directed to said one area to form a weld between the members.

2. A method of welding members together comprising disposing the surface of one member in contact with the surface of a second member, clamping said members between the end portions of a pair of columns so that a force is in one area of the members, driving a mass in an orbital path and coupling said orbiting mass to one of said columns so that the latter moves in a combined torsional and oscillatory mode at the resonant frequency of said one of said columns and directs vibratory energy to said one area to form a weld between the members.

3. A method of welding members together comprising disposing the surface of one member in contact with the surface of a second member, clamping said members between the end portions of a pair of columns so that a force is applied in one area of the members, directing a pressurized fluid against a mass so as to drive the mass in an orbital path, coupling the mass in vibration transmitting relationship with one of the columns at the antinode thereof and at a point which will cause the column to move in a combined torsional and oscillatory mode, and applying sufficient driving force to the mass so as to cause said coupled column to resonate whereby vibratory energy is directed to said one area to form a weld between the members.

4. A method of welding members together comprising disposing the surface of one member in contact with the surface of a second member, clamping said members between the end portions of a pair of columns so that a predetermined force is applied in one area of the members, driving a mass in an orbital path so as to generate a rotating force vector, coupling the mass in vibration transmitting relationship with one of the columns on an axis adjacent and parallel to the longitudinal axis of said column whereby said rotating force vector is transverse to said column axis and causes a combined torsional and oscillatory bending of the column, and applying sufficient driving force to the mass to cause said coupled column to resonate whereby vibratory energy is directed to said one area to form a weld between the members.

References Cited

UNITED STATES PATENTS

| | | | |
|---|---|---|---|
| 2,496,291 | 2/1950 | High | 259—1 |
| 2,953,282 | 9/1960 | Peterson | 259—1 |
| 2,960,314 | 11/1960 | Bodine | 259—1 |
| 3,022,814 | 2/1962 | Bodine | 156—73 |
| 3,038,359 | 6/1962 | Jones et al. | 228—1 |
| 3,056,306 | 10/1962 | Muller | 259—1 |
| 3,166,840 | 1/1965 | Barcroft et al. | 29—470 |
| 3,184,841 | 5/1965 | Jones et al. | 29—470.1 |
| 3,184,842 | 5/1965 | Maropis | 29—470 |
| 3,220,268 | 11/1965 | Brandt | 259—1 |

JOHN F. CAMPBELL, *Primary Examiner.*

M. L. FAIGUS, *Assistant Examiner.*